(12) United States Patent
Berti et al.

(10) Patent No.: US 10,143,994 B2
(45) Date of Patent: Dec. 4, 2018

(54) APPARATUS AND METHOD FOR DRYING/CURING CHEMICAL PRODUCTS WITH A LED MODULE

(71) Applicant: CEFLA SOCIETÁ COOPERATIVA, Imola (BO) (IT)

(72) Inventors: Mirco Berti, Casalfiumanese (IT); Tommaso Virnicchi, Recanati (IT)

(*) Notice: Subject to any disclaimer, the term of this patent is extended or adjusted under 35 U.S.C. 154(b) by 48 days.

(21) Appl. No.: 15/444,405

(22) Filed: Feb. 28, 2017

(65) Prior Publication Data

US 2017/0252719 A1  Sep. 7, 2017

(30) Foreign Application Priority Data

Mar. 1, 2016  (IT) .................. 102016000021117

(51) Int. Cl.
*B01J 19/12* (2006.01)
*B05D 3/06* (2006.01)
*H05B 33/08* (2006.01)
*B05D 3/02* (2006.01)

(52) U.S. Cl.
CPC .......... *B01J 19/123* (2013.01); *B05D 3/0263* (2013.01); *B05D 3/06* (2013.01); *B05D 3/067* (2013.01); *H05B 33/0854* (2013.01); *B01J 2219/0801* (2013.01); *B01J 2219/1203* (2013.01)

(58) Field of Classification Search
CPC .............. B01J 19/123; B01J 2219/0801; B01J 2219/1203; B05D 3/06; B05D 3/067; B05B 33/0854
USPC ................................ 250/492.1, 493.1, 504 R
See application file for complete search history.

(56) References Cited

U.S. PATENT DOCUMENTS

| 2004/0166249 A1* | 8/2004 | Siegel ................ B41F 23/0409 427/558 |
| 2009/0148620 A1* | 6/2009 | Petermann .......... B41F 23/0466 427/511 |
| 2013/0228707 A1 | 9/2013 | Nieminen |
| 2015/0336372 A1 | 11/2015 | Van Ness |

FOREIGN PATENT DOCUMENTS

| WO | 2005068511 | 7/2005 |
| WO | 2008070559 | 6/2008 |
| WO | 2014200418 | 12/2014 |

* cited by examiner

Primary Examiner — Nicole Ippolito
(74) Attorney, Agent, or Firm — Themis Law

(57) ABSTRACT

A module for emitting radiations for curing and/or drying curable/dryable treatments like paints or glue applied on products includes a UV LED, emitting between 200 and 400 nm, or one IR LED, emitting between 600 and 1400 nm; a control circuit of the UV or IR LED; a supply circuit; a control circuit of the module; and a sensor detecting the product to be cured/dried.

4 Claims, 3 Drawing Sheets

APPARATUS AND METHOD FOR DRYING/CURING CHEMICAL PRODUCTS WITH A LED MODULE

FIELD OF THE INVENTION

The present invention relates to an apparatus and a method for curing/drying light-curable/dryable chemical products (paints, glues) through the emission of monochromatic light emitted by light emitting diodes (LEDs). In particular, the present invention relates to an oven for the light curing/drying of painted panels made of different materials (wood, fibrocement, glass, plastic, etc.).

BACKGROUND OF THE INVENTION

For coating surfaces of different materials, the most common industrial processes make use of products applied in liquid phase containing solvents, which later on have to be removed through evaporation: this requires long manufacturing times. Moreover, the vapors of the solvent themselves can be harmful for operators' health, and they have to be removed or absorbed in suitable filters. The process requires a huge consumption of energy, in that the parts to be dried are usually heated to facilitate solvent evaporation, and sometimes even cooled to allow their manipulation when leaving the drying oven.

In industrial processes, using paints and glues that polymerize instead of materials requiring drying is convenient, in that curing occurs in shorter times, with a greater convenience and versatility of industrial processes. One of the known curing systems consists in irradiating the material to be cured with UV radiation having suitable wavelength and appropriate intensity.

Alternatively, instead of UV radiations, infrared (IR) radiations can be used. In the following, explicit reference will be made to UV radiation, without losing generality.

The ultraviolet radiations are commonly classified according to their emission spectrum:

UV-A: radiation with wavelength comprised between 400 and 315 nm and energy comprised between 3.1 and 3.94 eV. This is the band nearest to the blue band of visible light; it is moderately dangerous for sight.

UV-B: radiation with wavelength comprised between 315 and 280 nm and energy comprised between 3.94 and 4.43 eV. In natural sunlight UV-B radiations are scarce; they can provoke eye inflammation (photokeratitis), and are mainly responsible for skin aging, erythemas and risk of cancer. UV-B radiations catalyze many chemical reactions.

UV-C: radiation with wavelength comprised between 280 and 100 nm and energy comprised between 4.43 and 12.4 eV. They are normally not present in natural sunlight, and are very dangerous in case of human eye and skin exposure; they are used in germicidal lamps and in the light curing of chemical products.

UV-lamps are well known in the art; the known UV-lamps tend not to reproduce the whole spectrum of natural sunlight, but generate a spectrum with a strong component of UV light and a component of visible light. Known lamps are discharge lamps that consist of an ampoule or a glass or quartz tube containing a gas and at least two electrodes, between which gas ionization occurs. Through ionization, the gas emits photons according to the electro-magnetic emission spectrum of the gas itself. Supplemental electrodes for triggering may be present. In the known art, the most common lamps use mercury vapors, which is in liquid phase in the ampoule, and transitions to gas phase during the initial heating of the ampoule when ignited. The emitted electromagnetic radiation can have a wide spectrum going from far UV (UV-C) to infrared. Moreover, in the art ovens for the light curing of light-curable products making use of the above-described lamps are known.

The curing of chemical products catalyzed by light (light curing) has a peak of efficiency in correspondence of specific wavelengths. Chemical reactions are known which are catalyzed by red or green visible light (as, for example, the natural photosynthetic processes which occur in plants), while chemical reactions that are catalyzed by blue light are known (camphorquinone is often used as catalyst sensitive to wavelength between 440 and 480 nm). For industrial scopes, often substances sensitive to UV-B and UV-C wavelengths are used.

Exposing the substance, the reaction of which is to be catalyzed to only the radiations to which it is sensitive is clearly advantageous.

The main drawback of the known lamps is that, up to now, obtaining a UV emission only in the desired band was difficult, in that known lamps all have an important component of their emission ranging from infrared to visible light, and moreover to UV-B and UV-C. This entails a low efficiency, in that the emission of radiations of undesired wavelength has to be disposed of as heat, with negative effects on the device efficiency, the energy consumption and possibly the noise produced by fans. A second drawback is the short duration of the known lamps, which in best cases does not exceed 2000 hours of working time.

A third drawback is the slowness in switching up and re-switching up of the known lamps. As light emission is dependent on the temperature of the gas contained in the ampoule, known lamps reach their peak of emission several seconds after having been switched on. Moreover, in case of switching off, often some time has to elapse before one can re-switch on the lamp, so that keeping the lamp always on, even if it is not used is convenient, in order to prevent downtime.

Nowadays UV LED emitting radiations of a single desired wavelength are available.

Documents describing the use of UV LEDs to achieve these aims are known, as for instance:

US20110119949 of LUMINUS DEVICES INC describes a method using LEDs instead of traditional discharge lamps.

WO201131529 of Air Motion Systems describes a modular disposition of UV LEDs in order to obtain a high intensity of radiant power. LEDs are arranged inside a liquid-cooled structure, and the uniformity of light emission is obtained through the peculiar form of the reflector, which can be elliptic or parabolic, and of a lens in the form of a cylindrical bar made of an optically transparent material.

EP2601052 of IST METZ GMBH describes a method to manufacture modules comprising a plurality of LEDs, which can be arranged on a heat sink.

What is described above is the preferred embodiment. Nonetheless, in the field of known ovens, also infrared (IR) technology is used. In an alternative embodiment, the UV LEDs can be replaced with IR LEDs, emitting in the infrared band (600-1400 nm, preferably 800-1200 nm).

SUMMARY OF THE INVENTION

Aim of the present invention is providing an oven for light curing/drying chemical products applied on panels free of the above-mentioned drawbacks.

This object is achieved by an apparatus and a method having the features of the independent claims. Advantageous embodiments and refinements are specified in claims dependent thereon.

The system of the present invention comprises:

Any number of LEDs emitting electromagnetic radiations in the UV band, and preferably in the band having a wavelength ranging 200 to 400 nm, or LEDs emitting IR radiations in the band comprised between 600 and 1400 nm;

Optionally, any number of LEDs emitting electromagnetic radiation in bands different from ultraviolet, preferably in the band of visible light comprised between 400 and 800 nm, more preferably in the band of blue visible light comprised between 440 and 480 nm;

Supplying devices providing power supply for the UV/IR LEDs and optionally for the LEDs emitting visible light;

Control devices selectively activating for a pre-set time and intensity the UV/IR LEDs and optionally the visible light LEDs;

Devices for the support and mechanical protection of all the above-quoted components.

LEDs emitting visible light have a twofold aim: a first aim is obtaining a strong lighting of the object to be polymerized/dried, giving a psychological feeling of great power of the light emission, preventing or reducing the risks connected to the exposure of eyes to UV radiation, which, being perceived with difficulty, could cause serious damages to health. A second aim is obtaining a simulation of the light curing process through an innocuous radiation, which can be used during commercial demonstrations, shows, fairs, or even during adjustment of the apparatus.

A first advantage of the present invention consists in providing a lamp, which emits only the radiation of the desired wavelength, excluding any spurious emission in the undesired wavelengths. Obviously LED modules and curable products (paints, glues) having compatible wavelength will be chosen.

A second advantage of the present invention consists in a reduction in the number of system components, and therefore of the cost, of a lighting system. With the absence of spurious emissions of dangerous wavelength, no filter is needed, and the heat production being reduced, its disposal is much easier, generally without the need of fans or liquid cooling systems.

A third advantage is that, thanks to the reduction of components, and longer life of LED with respect to known lamps, there is an increase of system reliability.

A fourth advantage is linked to the increased efficiency, and therefore in the lower energy consumption of LEDs, with respect to known lamps.

With reference to this advantage, it is worth to be noted that having two kinds of LEDs, i.e. LEDs emitting UV/IR radiation and LEDs emitting in the visible band, precisely controlling the power of radiation in the UV/IR band and in the visible band becomes possible. On the other hand, using known UV lamps, which at the same time emit also in the visible band, the visible band is not controllable as it is collaterally produced. Therefore, its power is only controllable according to the desired intensity of the UV radiation, while the energy dissipated under the form of visible radiation is completely out of control and cannot be controlled (increased or lowered) without varying also the intensity of UV radiation.

A fifth advantage is due to the possibility of rapidly switching on and off UV LEDs with respect to traditional discharge lamps, allowing a very rapid adjustment of the lighted area according to the presence or absence of a surface to be cured.

A further advantage is the possibility of providing a LED bar having standardized form and dimensions: using LEDs having different wavelength, changing the light source of the oven is possible, to adapt it to the specific chemical product to be cured/dried.

BRIEF DESCRIPTION OF THE DRAWINGS

Further advantages and properties of the present invention are disclosed in the following description, in which exemplary embodiments of the present invention are explained in detail on the basis of the drawings.

DETAILED DESCRIPTION OF EMBODIMENTS OF THE INVENTION

Figure 1:
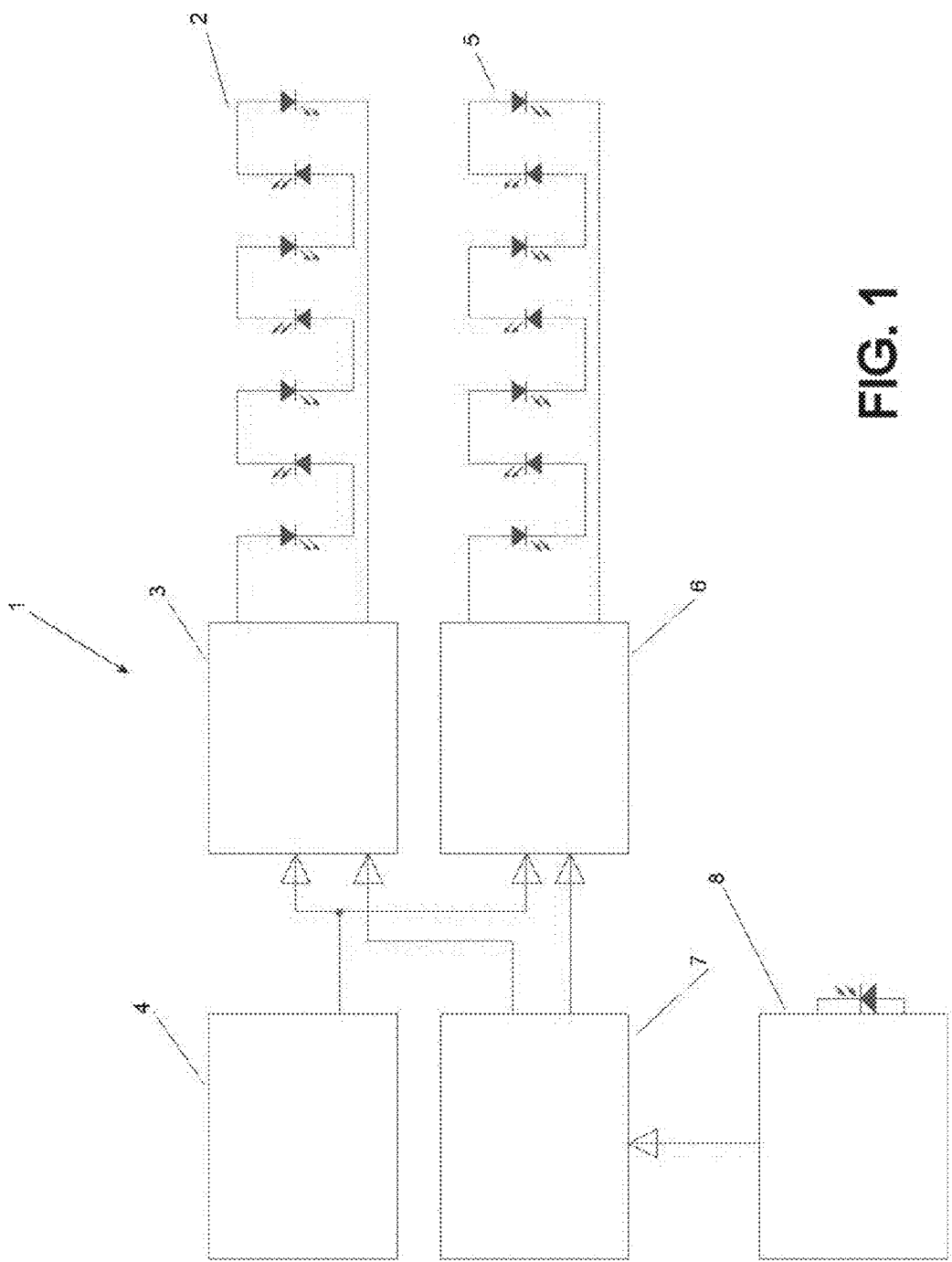
FIG. 1 is a block diagram of a curing/drying module according to the present invention.

FIG. 1 shows a block diagram of a curing/drying module in its preferred embodiment: 1 indicates the overall module. Module 1 comprises: a plurality of LEDs 2 emitting UV/IR light (i.e. emitting between 200 and 400 nm and between 600 and 1400 nm, respectively); a control circuit 3 of UV/IR LEDs 2; a supplying circuit 4; optionally a plurality of LEDs emitting visible light (comprised between 400 and 800 nm); optionally a control circuit 6 of visible light LEDs 5; a control circuit 7 of module 1, and a device 8 for detecting the panel to be cured/dried.

UV LEDs 2 have obviously the task to cure the curable materials, emitting UV radiation in suitable quality and quantity. IR LEDs 2 have the task to dry the dryable materials, emitting IR radiation in suitable quality and quantity. On the other hand, visible light LEDs 5 emit a cone of visible light substantially overlapping with the light cone emitted by UV/IR LEDs 2, so that naked eye can see that module 1 is emitting radiations. This is important in order to protect human operators, and can be very useful in case of fairs, shows, demonstrations, and even in case of apparatus adjustment.

Visible light LEDs 5 might emit light of any color; in the preferred embodiment, they emit blue visible light (between 440 and 480 nm).

Control circuits 3 and 6 are equivalent, and drive UV/IR LEDs 2 and visible light LEDs 5 with a constant current.

The supplying circuit 4 provides power supply, suitable for voltage and current, to the whole module 1. The module control circuit 7 is dependent on a sensor 8 detecting the presence of the material to be cured/dried on the conveyor in the area covered by module emission, in a known way to the skilled person.

The module 1, containing all the above-described elements, is assembled with a plurality of similar modules 1, in order to obtain a lighting bar 9 having a length corresponding to the width of a conveyor 20.

Figure 2:
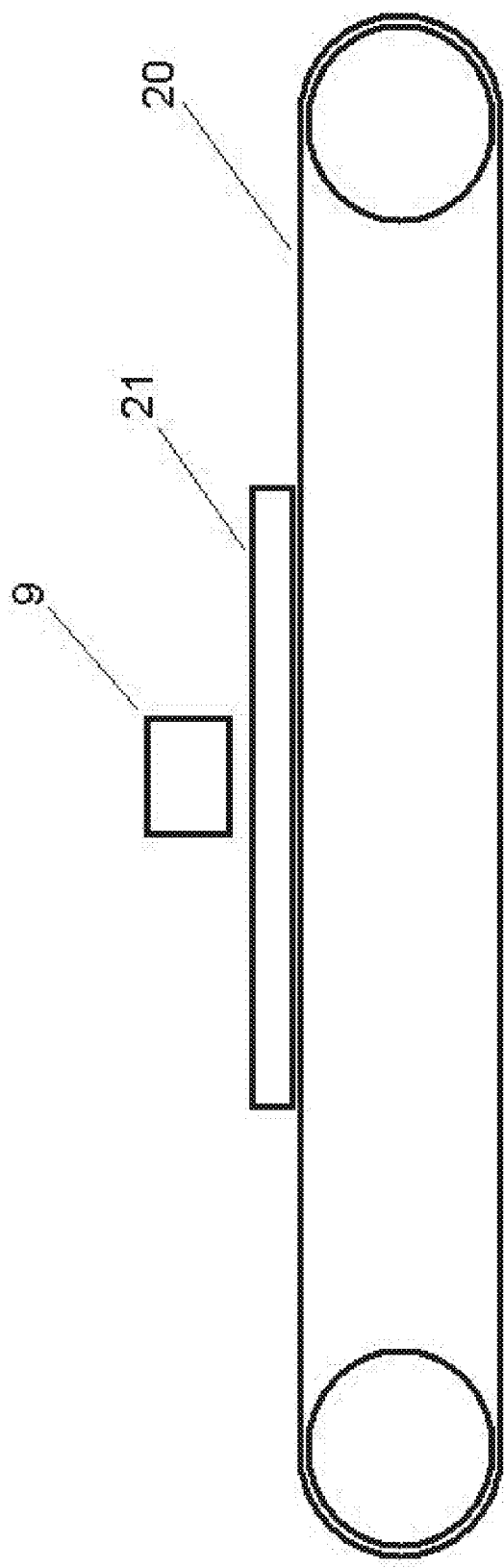
FIG. 2 is a longitudinal section of an oven for curing/drying painted panels.

FIG. 2 shows a typical conveyor 20 conveying the painted products 21 which have to be cured/dried through the action of the UV radiations emitted by the bar 9 comprising a plurality of modules 1. Said products move under the bar 9, with an adjustable speed, typically in the order of some meters per minute.

The single modules 1 contained in a bar 9 can be switched on and off independently from each other, thanks to the presence of the detecting device 8, identifying the presence of a painted panel 21 conveyed by conveyor 20.

FIG. 2 shows a top view of the conveyor 20, of a bar 9 and of a painted product 21 to be cured, in particular a window frame, which is a rectangular frame, empty in its centre.

Figure 3:
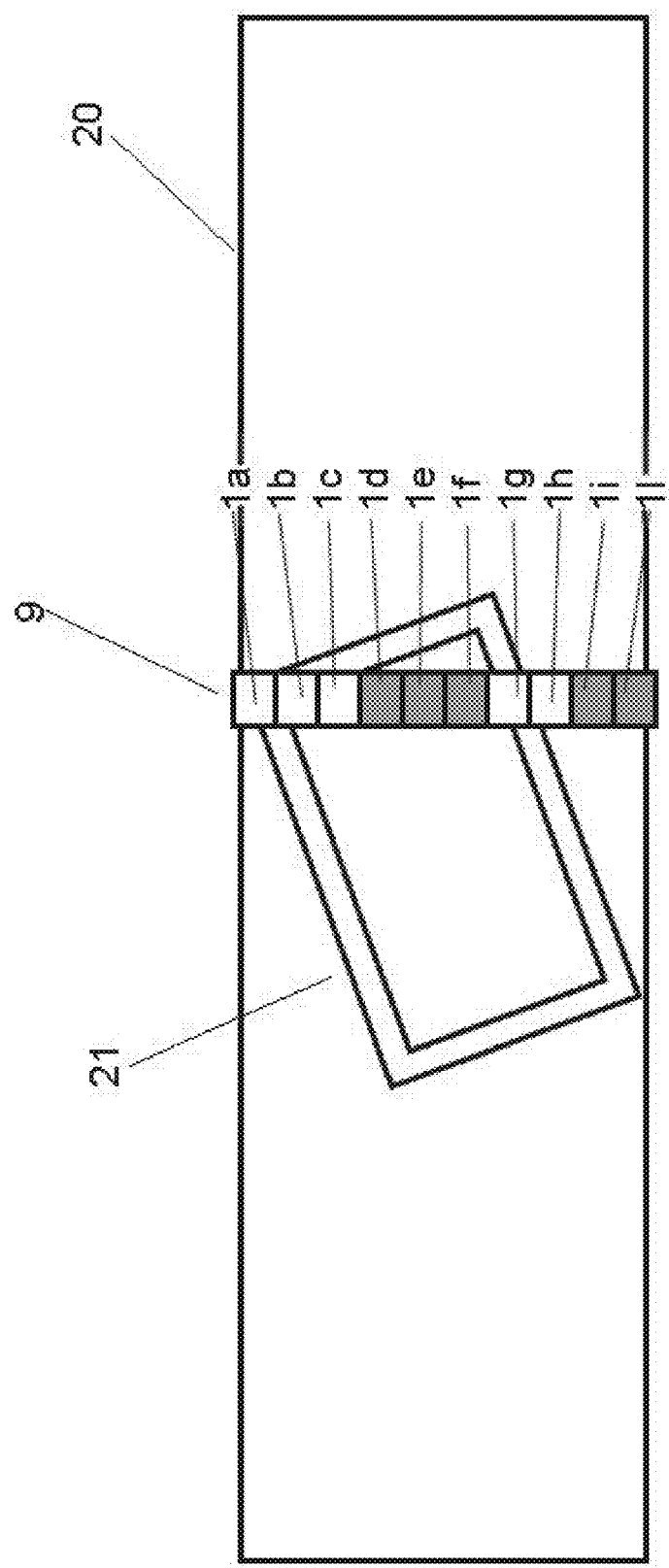
FIG. 3 is a top view of an oven for curing/drying painted panels.

The modules 1 belonging to the bar 9, which is transversally arranged with respect to the movement of a conveyor 20, are switched on when the detecting device 8 of each module 1 detects the presence of a painted product 21 conveyed by conveyor 20 inside the UV radiation cone emitted by UV LEDs 2, and switched off when the product 21 passes beyond the position of that specific module 1. In the example shown in FIG. 3, the modules 1a, 1b, 1c, 1g and 1h are switched on as they are over the window frame 21, while the modules 1d, 1e, 1f, 1i, 1l are switched off in that they would not irradiate the window frame 21.

When the painted panel 21 reaches the position of the bar 9, the modules 1 in correspondence of painted panel 21 are selectively and exclusively switched on. Therefore, neither UV/IR LEDs 2, nor optionally visible light LEDs 5, which find themselves in correspondence of parts of the conveyor 20 on which at least one panel 21 is not present, are switched on. When the painted product 21 passes beyond the position of UV LEDs 2, the single modules 1 are selectively switched off.

This allows to further reduce the costs and the energy consumption, and also to extend the maintenance time for LED lamps with reference to their working hours.

Without limiting in any way the various possibilities in the state of the art, the detection of the shape of a product to be irradiated with reference to its form, and specifically to frames, can be made through detection with cameras or other types of sensor which detect the product, or through sensors of the signal reflected from the conveyor and of the product, thanks to which discriminating an empty part and a full part of the product is possible. The detected signal is read directly by control circuits 3, 6, and/or 7 and determines the triggering or the switching off of the corresponding module. In an alternative operation, e.g. in the case of demonstration or fairs, and when maintenance is requested, requiring the opening of the external protecting structures of the apparatus, the same above-described functions can be performed switching on the visible LEDs 5 only, giving the visual feeling of the working of apparatus, without exposing the human operator to dangerous UV/IR radiations.

In the electrical system of an industrial apparatus, the supply voltage can be subjected to variations and even to disturbances, due to the length of connections and to the activation and deactivation of some organs of the apparatus itself, e.g. switching on and off of motors, fans, etc. As LEDs need a well-controlled power supply in order to work in an optimal way, in the preferred embodiment each module 1 has its distinct feeding circuit 4, which receives a non-accurately stabilized supply from the electrical system of the oven, while supplying precisely and without disturbances the LED control circuits.

The bar 9 supporting the modules 1 comprises an electrified rail to which the single modules 1 are removably fixed, e.g. through elastic or spring contacts. This allows an easy replacement of failing modules 1, and potentially even the possibility of fixing modules 1 of different kinds (e.g. comprising LEDs emitting a specific, different wavelength).

The radiant power required for UV light is variable according to the kind of chemical product to be cured/dried, but is about in the order of some Watt (W×cm2×sec). Indicatively, for a module 1 realized with a physical dimension of 10×10 cm, working on a conveyor advancing at 10 m/min, the typical power absorbed by each module is between 150 and 200 Watt.

LIST OF REFERENCE CHARACTERS

1 Curing/drying module
2 UV LEDs emitting radiation comprised between 200 and 400 nm
3 Control circuit for UV LEDs
4 Supplying circuit
5 Visible light LEDs emitting radiation comprised between 400 and 800 nm
6 Control circuit for visible light LEDs
7 Control circuit of the module
8 Detecting device
9 Bar
20 Conveyor
21 Painted panel

The invention claimed is:

1. A method of curing/drying a product treated with a curable/dryable chemical product,
   wherein the product to be cured/dried has a position and a shape and is disposed on a conveyor, and
   wherein only modules of a lighting bar that generate radiation towards or incident on with the product are activated, and
   wherein modules of the lighting bar that that generate a radiation toward empty areas of the shape to be irradiated are kept switched off, and are switched on when areas of the shape of the product fall within an emission field of the modules,
   the method comprising the following steps:
   loading the product to be cured/dried on the conveyor; and
   exposing the product to an action of at least one module, wherein the at least one module comprises,
      a UV LED, emitting between 200 and 400 nm, or a IR LED, emitting between 600 and 1400 nm,
      a control circuit of the UV LED or IR LED,
      a supply circuit,
      a control circuit of the module, and
      a sensor detecting the product to be cured/dried,
   wherein, when the product passes under the at least one module, the sensor detects a presence of the product, and
   wherein the control circuit causes emission of UV o IR radiations from the UV LED or IR LED contained in the module.

2. The method according to claim 1, wherein emission of visible radiation from a second LEDs is also triggered, the second LED emitting visible light between 400 and 800 nm, whose emission cone is overlapping an emission cone emitted by the UV LED o the IR LED, the second LED having a dedicated control circuit.

3. The method according to claim 2, wherein a plurality of modules is mounted on the lightning bar, each of the plurality of modules emitting UV o IR radiations independently from adjacent modules, the plurality of modules being controlled by a separate feeding signal.

4. The method according to claim 3, wherein, under predetermined conditions, the emission of visible radiation only is activated from one or more second LEDs.

* * * * *